United States Patent [19]

Murao

[11] Patent Number: 5,302,834
[45] Date of Patent: Apr. 12, 1994

[54] OPTICAL PICKUP AND TILT CONTROL DEVICE INCLUDING A PLURALITY OF PHOTOSENSITIVE UNITS FOR GENERATING SIGNALS INDICATING WHETHER TILT CORRECTION IS NECESSARY

[75] Inventor: Noriaki Murao, Tokorozawa, Japan

[73] Assignee: Pioneer Electronic Corporation, Tokyo, Japan

[21] Appl. No.: 974,629

[22] Filed: Nov. 12, 1992

[30] Foreign Application Priority Data

Nov. 15, 1991 [JP] Japan ................. 3-300710

[51] Int. Cl.$^5$ ............................................. G11B 7/00
[52] U.S. Cl. .................................. 250/561; 250/201.5; 369/44.32
[58] Field of Search .................... 250/201.5, 216, 561; 369/44.14, 44.23, 44.32

[56] References Cited

U.S. PATENT DOCUMENTS 5,001,690  3/1991  Kamiya et al. .................. 369/44.32
5,136,149  8/1992  Fujiwara et al. ................. 369/44.32

Primary Examiner—David C. Nelms
Assistant Examiner—S. B. Allen
Attorney, Agent, or Firm—Sughrue, Mion, Zinn, Macpeak & Seas

[57] ABSTRACT

An optical pickup for reading information recorded on a recording surface of an optical information storage medium has a light beam source for emitting a linear light beam, and an optical system including an objective lens for converging the linear light beam as a linear image on the recording surface and collecting and emitting a light beam reflected from the recording surface. A tilt control device includes a parallel flat glass plate for refracting the reflected light beam from the optical system, a plurality of photodetector units each having a plurality of photosensitive surfaces for photoelectrically converting the light beam applied thereto from the parallel flat glass plate into a plurality of respective detected signals, an error generator for processing the detected signals from the photodetector units into a tilt error signal indicative of whether the linear light beam is applied perpendicularly to the recording surface, and an actuator responsive to the tilt error signal for controlling the objective lens positionally with respect to the optical information storage medium to apply the linear light beam perpendicularly to the recording surface.

18 Claims, 13 Drawing Sheets

RADIAL DIRECTION OF DISC

CIRCUMFERENTIAL DIRECTION OF DISC

OPTICAL PICKUP AND TILT CONTROL DEVICE INCLUDING A PLURALITY OF PHOTOSENSITIVE UNITS FOR GENERATING SIGNALS INDICATING WHETHER TILT CORRECTION IS NECESSARY

BACKGROUND OF THE INVENTION

1. Field of the Invention

The present invention relates to an optical pickup for reading recorded information from an optical information storage medium such as a compact disc, a laser video disc, or the like, and a tilt control device for use with such an optical pickup.

2. Description of the Prior Art

Some optical pickups for reading recorded information from an optical information storage medium such as a compact disc, a laser video disc, or the like have a tilt detecting device for detecting whether a light beam emitted from a light source is applied perpendicularly to the recording surface of the optical information storage medium.

One tilt detecting device for use with an optical pickup is shown in FIGS. 1(A) and 1(B) of the accompanying drawings. As shown in FIGS. 1(A) and 1(B), the tilt detecting device, generally designated by the reference numeral 200, has a semiconductor laser 31 for emitting a laser beam toward an optical disc DK, two photodetectors 32, 33 for detecting and photoelectrically converting a light beam reflected from a recording surface $S_2$ of the optical disc DK into detected electric signals, and a differential amplifier 34 for calculating the difference between the detected signals from the photodetectors 32, 33 to produce a tilt error signal TE indicative of whether the laser beam is applied perpendicularly to the recording surface $S_2$ of the optical disc DK.

If the semiconductor laser 31 and the photodetectors 32, 33 face properly to the optical disc DK, as shown in FIG. 1(A), then the two photodetectors 32, 33 detect equal intensities of the reflected light beam, and hence the differential amplifier 34 produces output signal of zero. If the optical disc DK is tilted with respect to the semiconductor laser 31 and the photodetectors 32, 33 as shown in FIG. 1(B), the photodetector 32 detects a higher intensity of the reflected light beam than the photodetector 33, so that the differential amplifier 34 produces a positive output signal, thus detecting the tilt of the optical disc DK. A suitable control unit including an actuator may be connected to the tilt detecting device 100, thus making up a tilt control device for correcting the position of the optical pickup so that the laser beam will be applied perpendicularly to the recording surface $S_2$ of the optical disc DK.

The tilt control device is disadvantageous in that its semiconductor laser 31 and the photodetectors 32, 33 are required in addition to the optical pickup which is used to reproduce an information signal recorded on the optical disc DK. Therefore, the entire assembly of the optical pickup and the tilt control device has a complex structure and a large size.

SUMMARY OF THE INVENTION

It is an object of the present invention to provide an optical pickup which is relatively simple in structure.

Another object of the present invention is to provide a tilt control device of a relatively simple structure for an optical pickup.

According to the present invention, there is provided an optical pickup for reading information recorded on a recording surface of an optical information storage medium, including a light beam source for emitting a linear light beam, an optical system for converging the linear light beam as a linear image on the recording surface and collecting and emitting a light beam reflected from the recording surface, refracting unit for refracting the reflected light beam emitted from the optical system, and a plurality of photodetector units each having a plurality of photosensitive surfaces for photoelectrically converting the light beam applied thereto from the refracting unit into a plurality of respective detected signals indicative of a tilt of the optical system with respect to the optical information storage medium.

According to the present invention, there is also provided a tilt control device for use in an optical pickup for reading information recorded on a recording surface of an optical information storage medium, including a light beam source for emitting a linear light beam, an optical system including an objective lens for converging the linear light beam as a linear image on the recording surface and collecting and emitting a light beam reflected from the recording surface, refracting unit for refracting the reflected light beam emitted from the optical system, a plurality of photodetector units each having a plurality of photosensitive surfaces for photoelectrically converting the light beam applied thereto from the refracting unit into a plurality of respective detected signals, processing unit for processing the detected signals from the photodetector units into a tilt error signal indicative of whether the linear light beam is applied perpendicularly to the recording surface, and control unit responsive to the tilt error signal for controlling the objective lens positionally with respect to the optical information storage medium to apply the linear light beam perpendicularly to the recording surface.

The reflected light beam from the optical system is refracted by the refracting unit and then applied to the photosensitive surfaces of the photodetector units. The detected signals from the photodetector units are processed by the processing unit into the tilt error signal indicative of whether each of the photodetector units is too close to or far from the recording surface of the optical information storage medium. The photosensitive surfaces of the photodetector units can produce the detected signals using a portion of the reflected light beam applied thereto. The photodetector units may also be used to detect a focus error signal. Therefore, the optical pickup may be relatively simple in structure.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

1st Embodiment

Figure 1A:
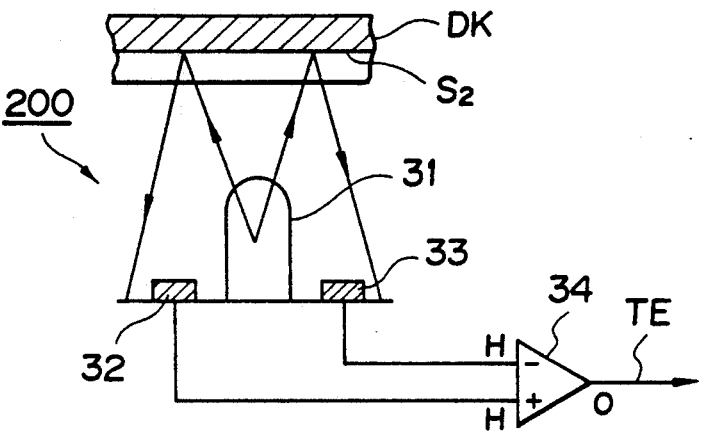
FIGS. 1(A) and 1(B) are schematic cross-sectional views of a tilt detecting device.
Figure 1B:
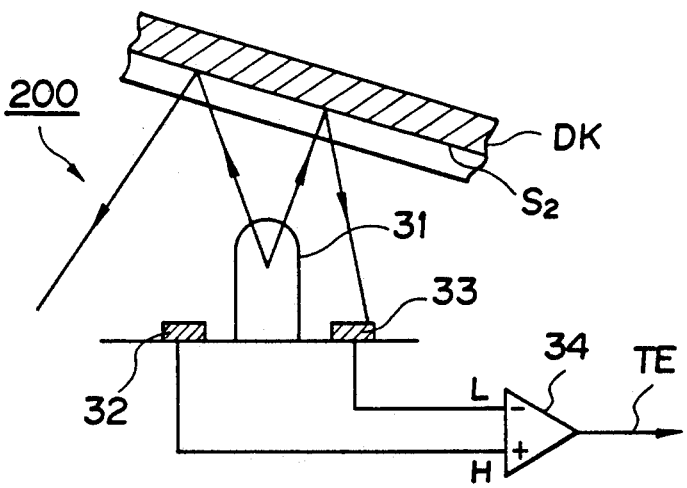
Figure 2:
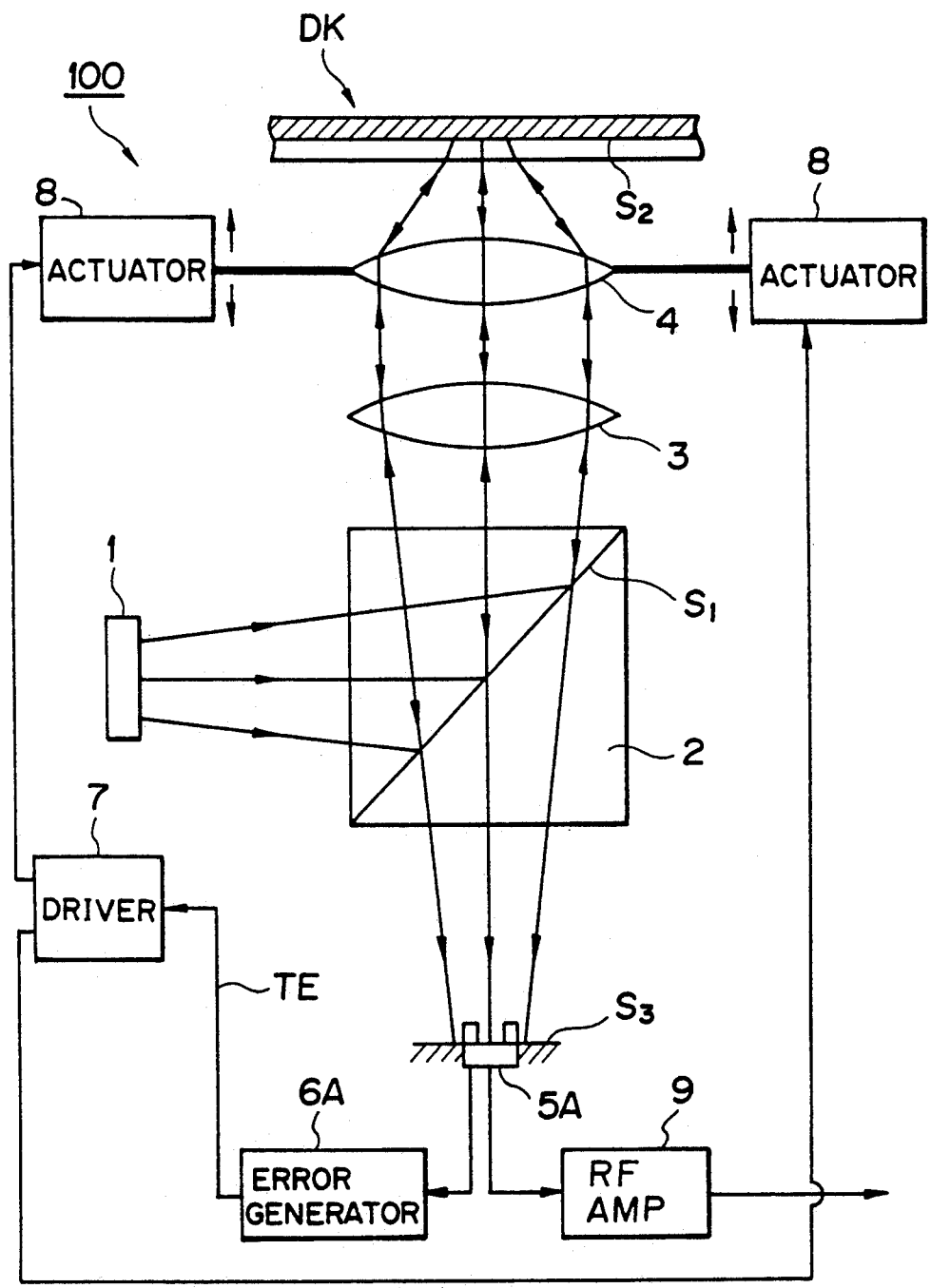
FIG. 2 is a schematic view of a tilt control device according to a first embodiment of the present invention.

FIGS. 2 through 8(A), 8(B), 8(C) show a tilt control device for use with an optical pickup, according to a first embodiment of the present invention. As shown in FIG. 2, the tilt control device, generally designated by the reference numeral 100, has a semiconductor laser 1 for emitting a linear laser beam having a predetermined length across its optical axis, a beam splitter 2 having a reflecting surface S, for reflecting the laser beam from the semiconductor laser 1 toward an optical disc DK as an optical information storage medium, a collimator lens 3 for converting the laser beam from the beam splitter 2 into a parallel laser beam, and an objective lens 4 for converging the parallel laser beam from the collimator lens 3 as a linear image or a linear beam spot on a recording surface $S_2$ of the optical disc DK.

The tilt control device 100 also has a photodetector 5A for detecting a portion of a linear beam which has been reflected by the recording surface $S_2$, traveled back through the objective lens 4 and the collimator lens 3, passed through the reflecting surface S, in the beam splitter $S_2$, and reached a surface $S_3$, and photoelectrically converting the detected linear beam portion into a plurality of detected electric signals, an error generator 6A for generating a tilt error signal TE indicating whether the optical pickup, namely, the objective lens 4, is tilted with respect to the optical disc DK, based on the detected electric signals from the photodetector 5A, a driver 7 for producing a drive signal based on the tilt error signal TE from the error generator 7, and an actuator 8 responsive to the drive signal for controlling the tilt of the objective lens 4 with respect to the optical disc DK.

Another portion of the linear beam that has fallen on the surface $S_3$ is read as an RF signal indicative of the information recorded on the optical disc DK, and the RF signal is sent to an RF amplifier 9. The RF signal is amplified at a suitable gain by the RF amplifier 9, which applies the amplified RF signal to a signal demodulator (not shown).

Figure 3:
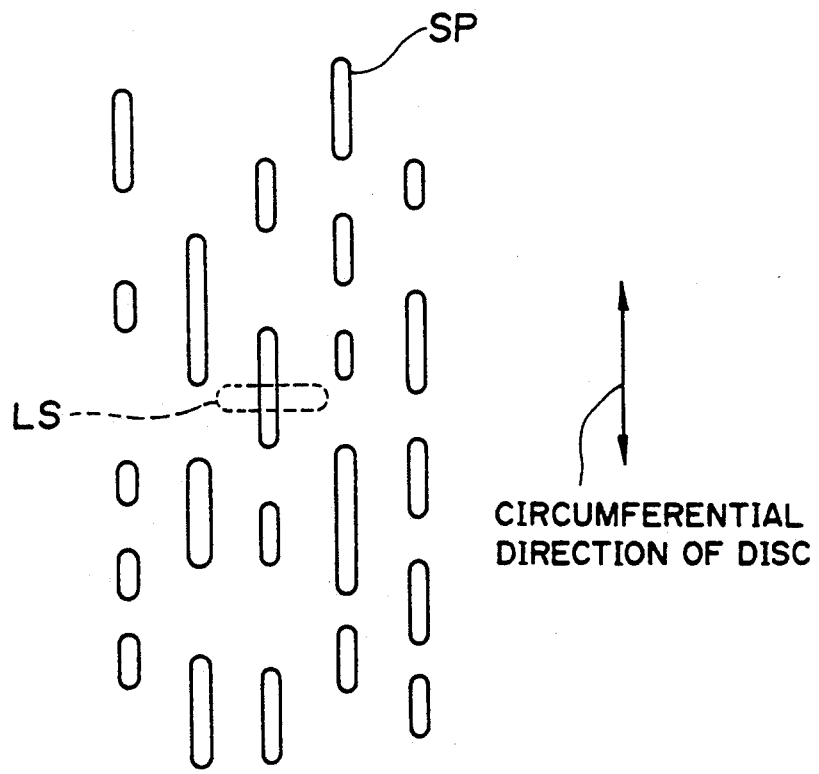
FIG. 3 is a diagram showing the relationship between signal pits and a linear beam spot on an optical disc for the tilt control device according to the first embodiment.

FIG. 3 shows the relationship between signal pits SP and a linear beam spot LS on the optical disk DK, the linear beam spot LS being formed on the recording surface $S_2$ by the laser beam applied thereto. The linear beam spot LS extends linearly perpendicularly to a track direction, i.e., a circumferential direction, and covers only one track or row of signal pits SP but does not reach adjacent tracks.

Figure 4A:
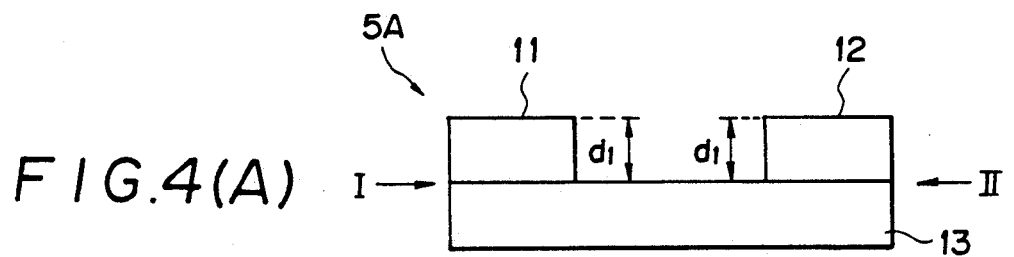
FIGS. 4(A) and 4(B) are front elevational and plan views, respectively, of a photodetector in the tilt control device according to the first embodiment.
Figure 4B:
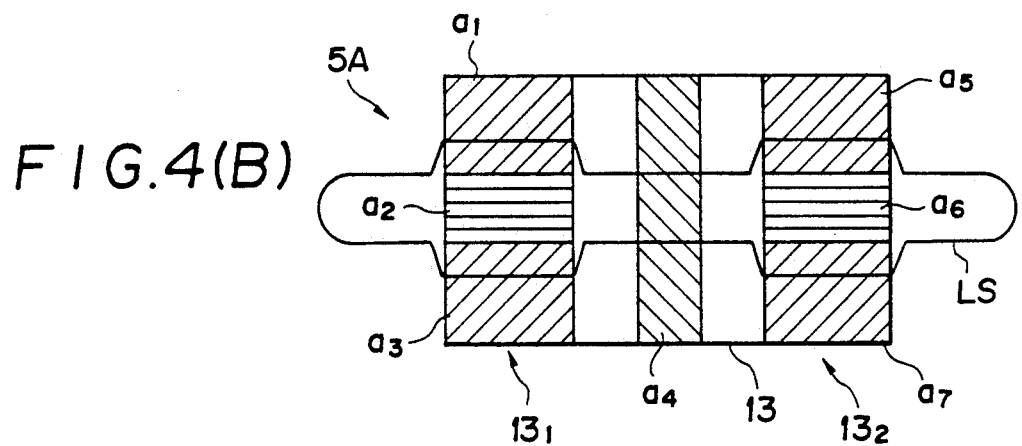
Figure 4C:
FIGS. 4(C) and 4(D) are side elevational views of the photodetector, as viewed in the directions indicated by the arrows I and II, respectively, in FIG. 4(A)
Figure 4D:

FIGS. 4(A), 4(B), 4(C), and 4(D) show the photodetector 5A in detail. As shown in FIGS. 4(A), 4(B), 4(C), and 4(D), the photodetector 5A includes a photodetector element 13 for detecting a linear beam spot LS reflected from the optical disc DK and two parallel flat glass plates 11, 12 mounted on and covering portions of the photodetector element 13. The photodetector element 13 has three photosensitive surfaces $a_1$, $a_2$, $a_3$ successively arranged across the photodetector element 13 at one end thereof, a single photosensitive surface $a_4$ extending across the photodetector element 13 and spaced from the three photosensitive surfaces $a_1$, $a_2$, $a_3$, and three photosensitive surfaces $a_5$, $a_6$, $a_7$ successively arranged across the photodetector element 13 at the opposite end thereof and spaced from the photosensitive surface $a_4$. The parallel flat glass plates 11, 12 cover the three photosensitive surfaces $a_1$, $a_2$, $a_3$ and $a_5$, $a_6$, $a_7$ in their entirety. Each of the parallel flat glass plates 11, 12 has a thickness $d_1$ and an absolute refractive index $n_1$ and an optical path $n_1 \times d_1$. The photosensitive surfaces $a_1$–$a_7$ photoelectrically convert the detected reflected linear beam spot LS into respective detected electric signals $I_1$–$I_7$. The signals $I_1$–$I_3$, $I_5$–$I_7$ are used to detect a tilt error, and the signal $I_4$ represents an information signal indicative of the information recorded on the optical disc DK. As shown in FIG. 4(B), the reflected linear beam spot LS from the optical disc DK is applied across the photosensitive surfaces $a_1$–$a_7$.

Operation of the tilt control device according to the first embodiment will be described below with reference to FIGS. 5(A), 5(B), 5(C) through B(A), 8(B), 8(C).

Figure 5A:
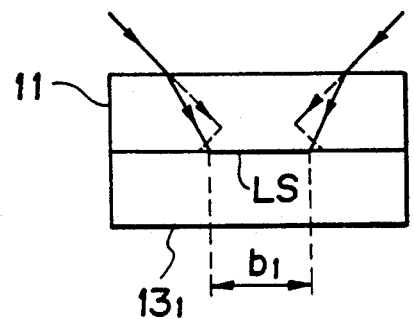
FIGS. 5(A), 5(B), and 5(C) are side elevational views showing a linear beam applied to the photodetector shown in FIGS. 4(A) and 4(B)
Figure 5B:
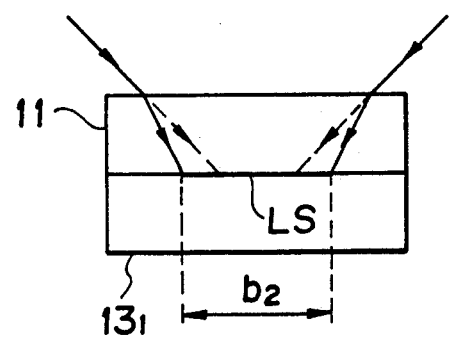
Figure 5C:
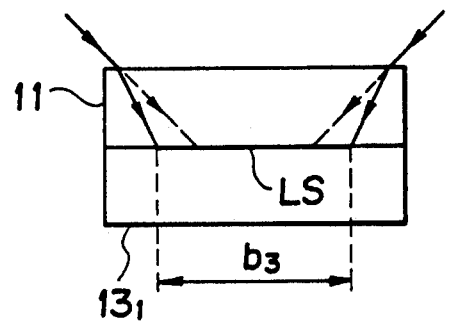

FIGS. 5(A), 5(B), 5(C) show the reflected linear beam LS that is applied to the photodetector 5A, as viewed in the direction indicated by the arrow I in FIG. 4(A). In FIG. 5(A), the reflected linear beam spot LS is shown as being applied to the photodetector 5A when the distance between a photodetector unit $13_1$ composed of the photosensitive surfaces $a_1$-$a_3$ and the optical disc DK is shorter than the focal length of the objective lens 4, i.e., when the photodetector unit $13_1$ is too close to the optical disc DK. In FIG. 5(B), the reflected linear beam spot LS is shown as being applied to the photodetector 5A when the distance between the photodetector unit $13_1$ and the optical disc DK is equal to the focal length of the objective lens 4. In FIG. 5(C), the reflected linear beam spot LS is shown as being applied to the photodetector 5A when the distance between the photodetector unit $13_1$ and the optical disc DK is longer than the focal length of the objective lens 4, i.e., when the photodetector unit $13_1$ is too far from the optical disc DK. In FIGS. 5(A), 5(B), and 5(C), the reflected linear beam LS applied to the photodetector 5A travels through the parallel flat glass plate 11 along a trajectory indicated by the solid-line arrows, and travels outside of the parallel flat glass plate 11 along a trajectory indicated by the brokenline arrows. The reflected linear beam LS has widths $b_1$, $b_2$, $b_3$ when they are applied as shown in FIGS. 5(A), 5(B), and 5(C), respectively, and these widths $b_1$, $b_2$, $b_3$ satisfy the relationship $b_1 < b_2 < b_3$ because of the refraction by the parallel flat glass plate 11. The above process holds true for the reflected linear beam LS which is applied through the parallel flat glass plate 12 to a photodetector unit $13_2$ composed of the photosensitive surfaces $a_5$-$a_7$.

Figure 6:
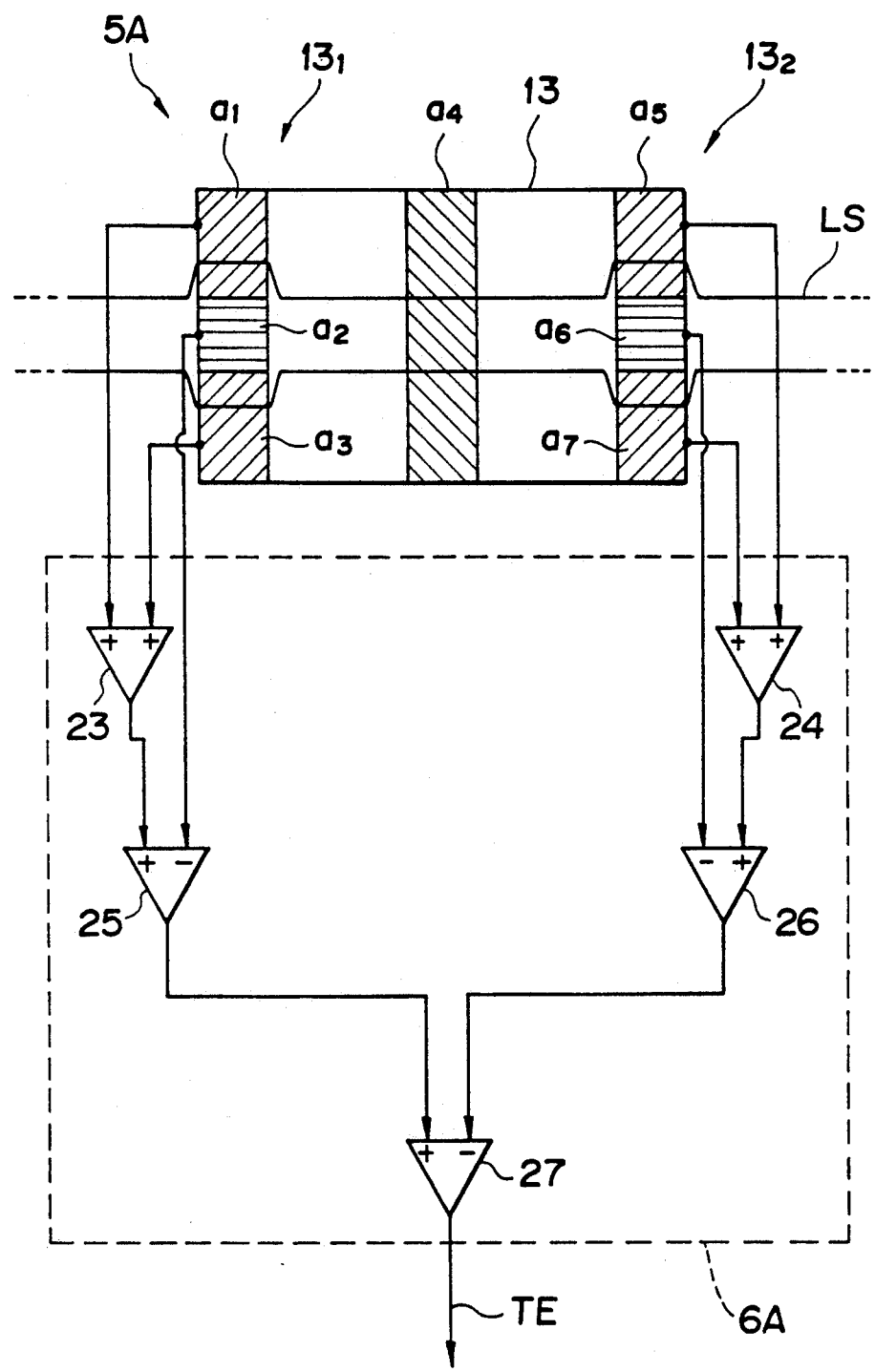
FIG. 6 is a schematic view, partly in block form, of the photodetector and an error generator in the tilt control device according to the first embodiment.

FIG. 6 shows the photodetector 5A and the error generator 6A connected to the photodetector 5A. As shown in FIG. 6, the error generator 6A has two adders 23, 24 and three subtractors 25, 26, 27. The adder 23 has one input terminal connected to the photosensitive surface $a_1$ and the other input terminal connected to the photosensitive surface $a_3$. The subtractor 25 has a negative input terminal connected to the photosensitive surface $a_2$ and a positive input terminal connected to the output terminal of the adder 23. The adder 24 has one input terminal connected to the photosensitive surface $a_5$ and the other input terminal connected to the photosensitive surface $a_7$. The subtractor 26 has a negative input terminal connected to the photosensitive surface $a_6$ and a positive input terminal connected to the output terminal of the adder 24. The subtractor 27 has a positive input terminal connected to the output terminal of the subtractor 25 and a negative input terminal connected to the output terminal of the subtractor 26. Therefore, the error generator 6A produces an output signal TE indicated by:

$$TE = (I_1 + I_3 - I_2) - (I_5 + I_7 - I_6) \quad (1)$$

as an output signal from the output terminal of the subtractor 27.

Figure 7A:
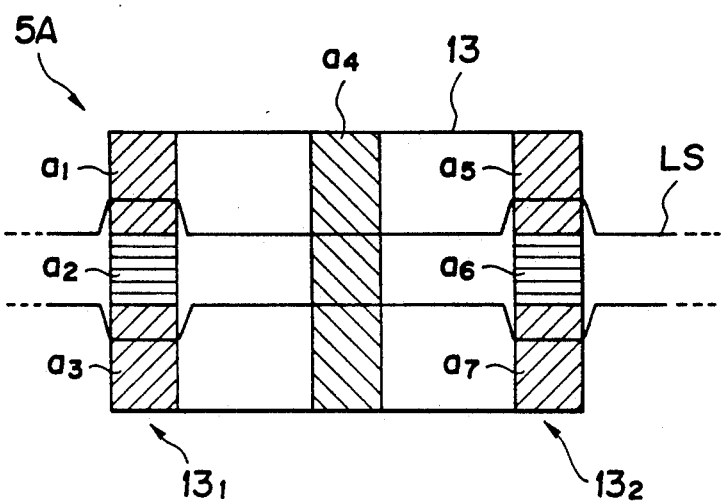
FIGS. 7(A), 7(B), and 7(C) are schematic views showing the manner in which the tilt control device according to the first embodiment operates.
Figure 7B:
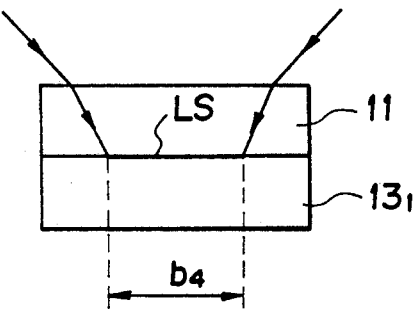
Figure 7C:
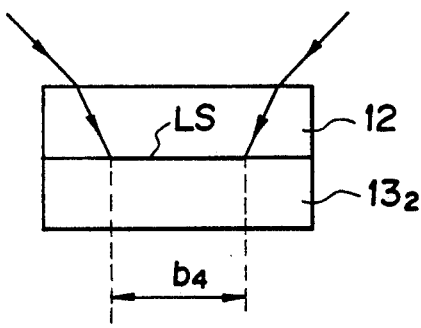

If the distance between the photodetector unit $13_1$ and the optical disc DK and the distance between the photodetector unit $13_2$ and the optical disc DK are the same as each other, then the reflected laser beam spot LS is applied to the photodetector 5A as shown in FIGS. 7(A), 7(B), and 7(C). The reflected laser beam spot LS has a width $b_4$ on the photosensitive surfaces of each of the photodetector units $13_1$, $13_2$. Therefore, the output signal from the subtractor 25 and the output signal from the subtractor 26 are equal to each other, and the output signal TE of the error generator 6A is TE = 0.

Figure 8A:
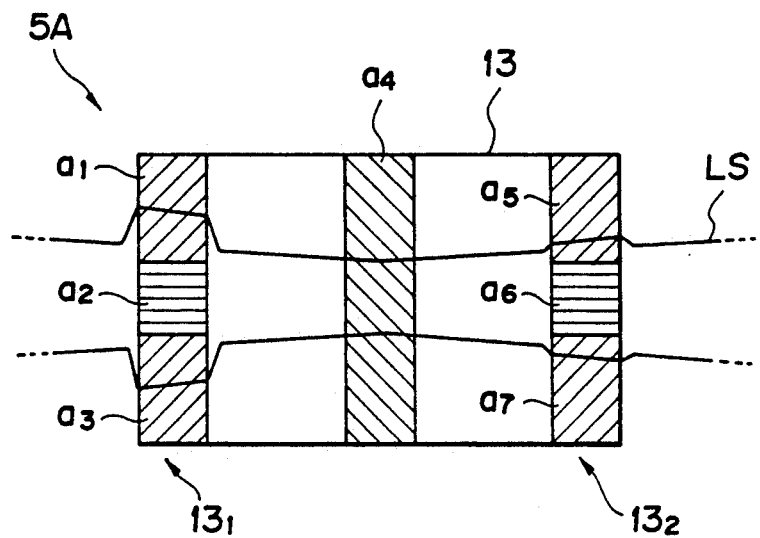
FIGS. 8(A), B(B), and 8(C) are schematic views showing the manner in which the tilt control device according to the first embodiment operates.
Figure 8B:
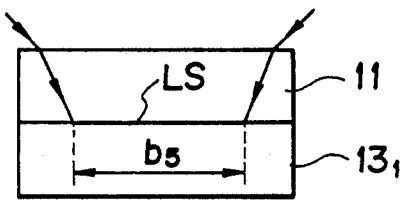
Figure 8C:
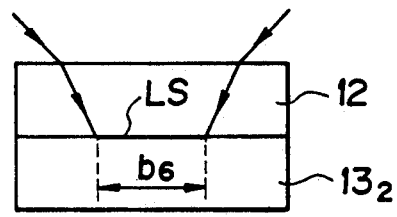

If the recording surface $S_2$ of the optical disc DK is inclined with respect to the linear laser beam applied thereto, e.g., if the photodetector unit $13_1$ is farther from the optical disc DK and the photodetector unit $13_2$ is closer to the optical disc DK, then the reflected laser beam spot LS is applied to the photodetector 5A as shown in FIGS. 8(A), 8(B), and 8(C). The reflected laser beam spot LS has a width $b_5$ on the photosensitive surfaces of the photodetector unit $13_1$, and the reflected laser beam spot LS has a width $b_6$ on the photosensitive surfaces of the photodetector unit $13_2$, with the width $b_5$ being larger than the width $b_6$ ($b_5 > b_6$).

The photosensitive surfaces and the optical system are designed such that when the linear laser beam spot or linear image on the recording surface $S_2$ of the optical disc DK is focused at the focal point of the objective lens 4, the respective detected signals $I_1$, $I_2$, $I_3$, $I_5$, $I_6$, $I_7$ satisfy the following equations:

$$FE_1 = I_1 + I_3 - I_2 = 0 \quad (2)$$

and $$FE_2 = I_5 + I_7 - I_6 = 0 \quad (3).$$

Then, when either one of the photodetector units $13_1$, $13_2$ is closer to the optical disc DK, as shown in FIG. 5(A), because of the refraction by the parallel flat glass plate 11 or 12, the detected signal $I_2$ from the photosensitive surface $a_2$ is larger than the sum of the detected signals $I_1$, $I_3$ from the photosensitive surfaces $a_1$, $a_3$. As a result, the following relationship is satisfied:

$$FE_1 = I_1 + I_3 - I_2 < 0 \quad (4)$$

and similarly $$FE_2 = I_5 + I_7 - I_6 < 0 \quad (5).$$

Conversely, when either one of the photodetector units $13_1$, $13_2$ farther from the optical disc DK, as shown in FIG. 5(C), because of the refraction by the parallel flat glass plate 11 or 12, the detected signal $I_2$ from the photosensitive surface $a_2$ is smaller than the sum of the detected signals $I_1$, $I_3$ from the photosensitive surfaces $a_1$, $a_3$. As a result, the following relationship is satisfied:

$$FE_1 = I_1 + I_3 - I_2 > 0 \quad (6)$$

and similarly $$FE_2 = I_5 + I_7 - I_6 > 0 \quad (7).$$

When the reflected linear beam spot LS is applied to the photodetector 5A as shown in FIGS. 8(A) through 8(C), therefore, the output signal from the error generator 6A is indicated by:

$$TE = (I_1 + I_3 - I_2) - (I_5 + I_7 - I_6) > 0 \quad (8).$$

When the photodetector unit $13_1$ is closer to the optical disc DK and the photodetector unit $13_2$ LS farther from to the optical disc DK, the output signal from the error generator 6A is indicated by:

$$TE < 0 \quad (9).$$

Accordingly, the output signal from the error generator 6A can be employed as a tilt error signal.

This is because the parallel flat glass plates 11, 12 each having a predetermined optical path and a refractive action cover the entire photosensitive surfaces $a_1$, $a_2$, $a_3$ and $a_5$, $a_6$, $a_7$ causing the reflected linear beam spot LS to have widths $b_1$, $b_2$, $b_3$ ($b_1 < b_2 < b_3$), respectively, on the photosensitive surfaces when the optical disc DK is inclined and not inclined with respect to the objective lens 4. If the photosensitive surfaces were not covered with the parallel flat glass plates 11, 12, then the reflected linear beam spot LS would fall on the photosensitive surfaces along the trajectory as indicated by the broken lines in FIGS. 4(A), 4(B), and 4(C). Although the output signals $FE_1$, $FE_2$ are $FE_1 = 0$, $FE_2 = 0$ when the laser beam spot is focused on the optical disc DK, the output signals $FE_1$, $FE_2$ would be $FE_1 > 0$, $FE_2 > 0$ when the laser beam spot is out of focus on the optical disc DK irrespective of whether it is overfocused or underfocused. Therefore, it would be impossible to determine whether either one of the photodetector units $13_1$, $13_2$ is closer to or farther from the optical disc DK, thus failing to determine which direction the optical disc DK is tilted in with respect to the objective lens 4 from the tilt error signal TE.

2nd Embodiment

Figure 9:
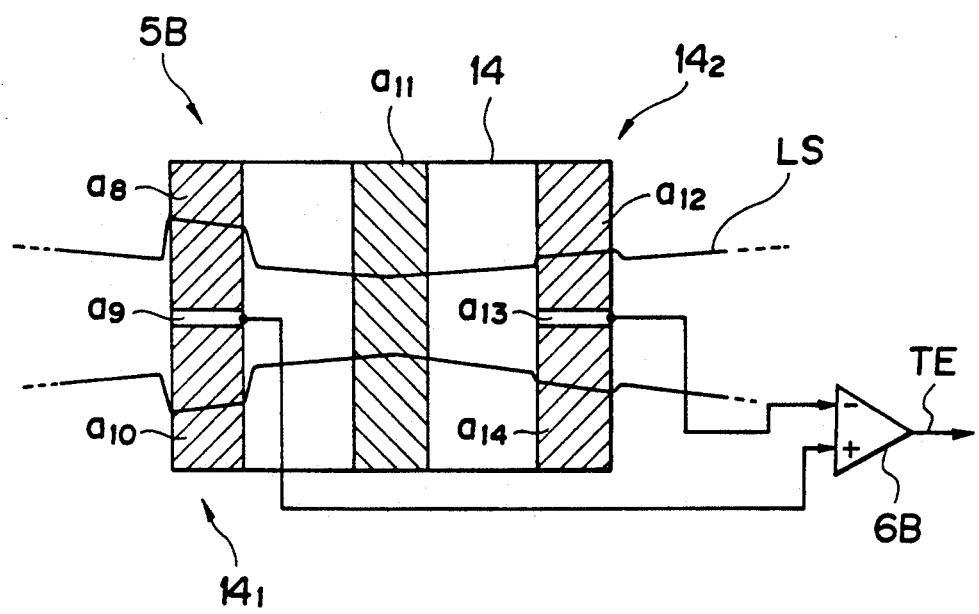
FIG. 9 is a plan view of a photodetector in a tilt control device according to a second embodiment of the present invention.

FIG. 9 shows a tilt control device according to a second embodiment of the present invention. The tilt control device according to the second embodiment is similar to the tilt control device according to the first embodiment except for a photodetector and an error generator. Therefore, only a photodetector and an error generator in the tilt control device according to the second embodiment are shown in FIG. 9.

As shown in FIG. 9, the photodetector, generally denoted at 5B, includes a photodetector element 14 for detecting a linear beam reflected from the optical disc DK and two parallel flat glass plates (not shown) mounted on and covering photodetector units $14_1$, $14_2$ in their entirety, of the photodetector element 14. The photodetector unit $14_1$ is composed of three photosensitive surfaces $a_8$, $a_9$, $a_{10}$ successively arranged across the photodetector element 14 at one end thereof. A single photosensitive surface $a_{11}$ extends across the photodetector element 14 and is spaced from the photosensitive surfaces $a_8$, $a_9$, $a_{10}$. The photodetector unit 142 is composed of three photosensitive surfaces $a_{12}$, $a_{13}$, $a_{14}$ successively arranged across the photodetector element 14 at the other end thereof and spaced from the photosensitive surface $a_{11}$. The central photosensitive surfaces $a_9$, $a_{13}$ of the photodetector units $14_1$, $14_2$, which detect a central portion of the reflected linear beam spot LS applied thereto, are connected to positive and negative input terminals of an error generator 6B. The error generator 6B generates an output signal indicative of the difference between output signals from the central photosensitive surfaces $a_9$, $a_{13}$, as follows:

$$TE = I_9 - I_{13} \tag{10}$$

In FIG. 9, the photodetector unit $14_1$ is farther from the optical disc DK than the photodetector unit $14_2$. Since the reflected beam spot LS is diffused as a whole, the relationship $I_9 < I_{13}$ is satisfied. Therefore, $$TE < 0 \tag{11}.$$

Conversely, when the photodetector unit $14_1$ is closer to the optical disc DK than the photodetector unit $14_2$, $$TE > 0 \tag{12}.$$

Accordingly, the output signal TE from the error generator 6B can be employed as a tilt error signal.

3rd Embodiment

Figure 10A:
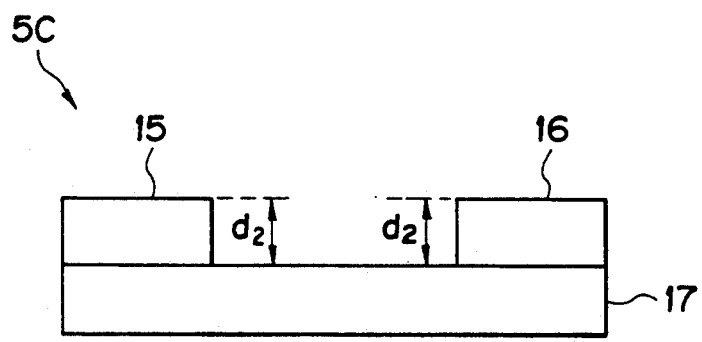
FIGS. 10(A) and 10(B) are front elevational and plan views, respectively, of a photodetector in a tilt control device according to a third embodiment of the present invention.
Figure 10B:
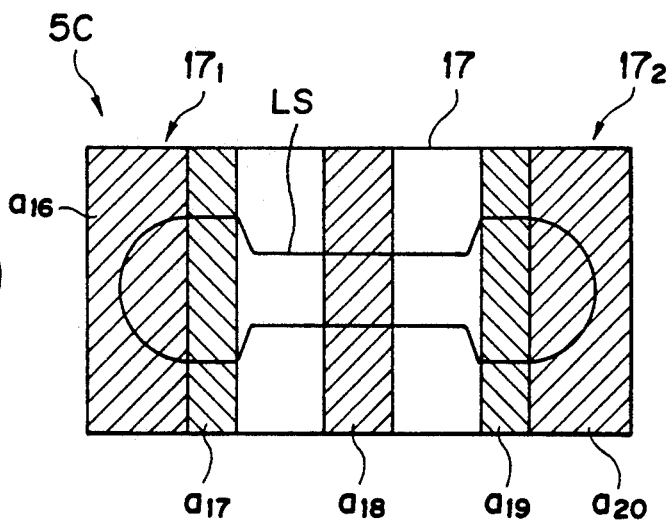

FIGS. 10(A) and 10(B) show a tilt control device according to a third embodiment of the present invention. The tilt control device according to the third embodiment is similar to the tilt control device according to the first embodiment except for a photodetector and an error generator.

As shown in FIGS. 10(A) and 10(B), the photodetector, generally denoted at 5C, includes a photodetector element 17 and two parallel flat glass plates 15, 16 mounted on and covering photodetector units $17_1$, $17_2$, in their entirety, of the photodetector element 17. The photodetector unit $17_1$ is composed of two parallel photosensitive surfaces $a_{16}$, $a_{17}$ extending across the photodetector element 17 at one end thereof. A single photosensitive surface $a_{18}$ extends across the photodetector element 17 and is spaced from the photosensitive surfaces $a_{17}$, $a_{19}$. The photodetector unit $17_2$ is composed of two parallel photosensitive surfaces $a_{19}$, $a_{20}$ extending across the photodetector element 17 at the other end thereof and spaced from the photosensitive surface $a_{18}$. Each of the parallel flat glass plates 15, 16 has a thickness $d_2$ and an absolute refractive index $n_2$ and an optical path $n_2 \times d_2$. The photosensitive surfaces $a_{16}$–$a_{20}$ photoelectrically convert the detected reflected linear beam spot LS into respective detected electric signals $I_{16}$–$I_{20}$. The signals $I_{16}$, $I_{17}$, $I_{19}$, $I_{20}$ are used to detect a tilt error, and the signal $I_{18}$ represents an information signal indicative of the information recorded on the optical disc DK. As shown in FIG. 10(B), the reflected linear beam spot LS from the optical disc DK is applied across the photosensitive surfaces $a_{17}$–$a_{19}$, and has opposite ends falling on the photosensitive surfaces $a_{16}$, $a_{20}$, respectively.

Operation of the tilt control device according to the third embodiment will be described below with reference to FIG. 10(B).

When the distance between the optical disc DK and the objective lens is proper, the photosensitive surfaces $a_{16}$, $a_{17}$, $a_{19}$, $a_{20}$ produce their output signals which meet the following equations:

$$FE_1 = I_{16} - I_{17} 0 \tag{13}$$

and $$FE_2 = I_{19} - I_{20} = 0 \tag{14}$$

and $$TE = FE_1 - FE_2 = 0 \tag{15}$$

where TE is the output signal from the error generator.

When the linear laser beam is not applied perpendicularly to the optical disc DK, the output signal TE becomes $TE > 0$ or $TE < 0$ because of the refraction by the parallel flat glass plate 15 or 16. The tilt of the objective lens with respect to the optical disc DK can be controlled based on the output signal or tilt error signal TE.

4th Embodiment

FIGS. 11(A) through 11(E) show a tilt control device according to a fourth embodiment of the present invention. The tilt control device according to the fourth embodiment is similar to the tilt control device according to the first embodiment except for a photodetector and an error generator.

Figure 11A:
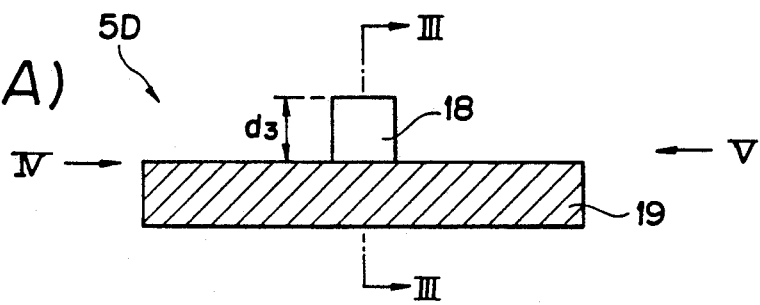
FIGS. 11(A) and 11(B) are front elevational and plan views, respectively, of a photodetector in a tilt control device according to a fourth embodiment of the present invention.
Figure 11B:
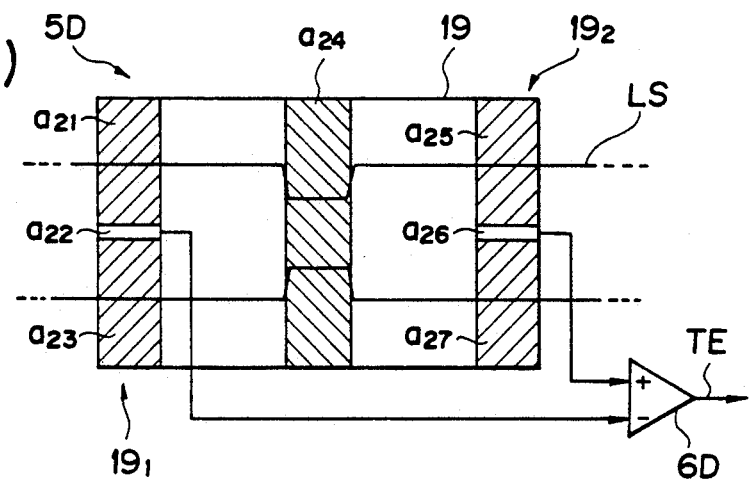

As shown in FIGS. 11(A) and 11(B), the photodetector, generally denoted at 5D, includes a photodetector element 19 and a parallel flat glass plate 18 mounted on and covering a portion of the photodetector element 19. The photodetector element 19 has a photodetector unit 19, composed of three photosensitive surfaces $a_{21}$, $a_{22}$, $a_{23}$ successively arranged across the photodetector element 19 at one end thereof, a single photosensitive surface $a_{24}$ extending across the photodetector element 19 and spaced from the photodetector unit $19_1$, and a photodetector unit $19_2$ composed of three photosensitive surfaces $a_{25}$, $a_{26}$, $a_{27}$ successively arranged across the photodetector element 19 at the other end thereof and spaced from the photosensitive surface $a_{24}$. The central photosensitive surface $a_{24}$ is covered in its entirety by the parallel flat glass plate 18. The parallel flat glass plate 18 has a thickness $d_3$ and an absolute refractive index $n_3$ and an optical path $n_3 \times d_3$. The photosensitive surfaces $a_{21}$–$a_{27}$ photoelectrically convert the detected reflected linear beam spot LS into respective detected electric signals $I_{21}$–$I_{27}$. The signals $I_{21}$–$I_{23}$, $I_{25}$–$I_{27}$ are used to detect a tilt error, and the signal $I_{24}$ represents an information signal indicative of the information recorded on the optical disc DK. As shown in FIG. 11(B), the reflected linear beam spot LS from the optical disc DK is applied across the photosensitive surfaces $a_{21}$–$a_{27}$. The central photosensitive surfaces $a_{22}$, $a_{26}$ of the photodetector units $19_1$, $19_2$ are connected to positive and negative input terminals of an error generator 6D. The error generator 6D generates an output signal indicative of the difference between output signals from the central photosensitive surfaces $a_{22}$, $a_{26}$, as follows:

$$TE = I_{22} - I_{26} \quad (26).$$

Figures 11C, 11D, 11E:
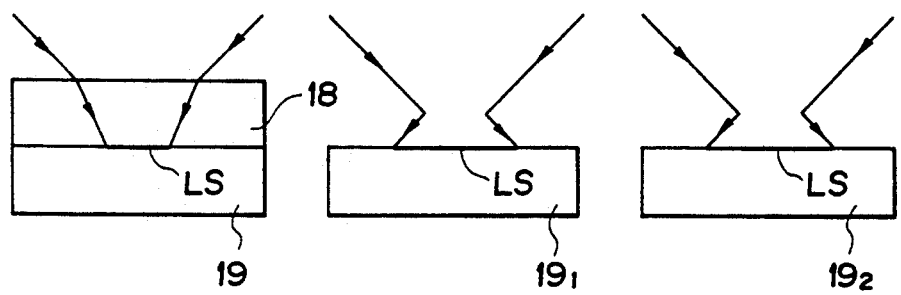
FIG. 11(C) is a cross-sectional view taken along line III—III of FIG. 11(A)
FIGS. 11(D) and 11(E) are side elevational views of the photodetector, as viewed in the directions indicated by the arrows IV and V, respectively, in FIG. 11(A)

The reflected beam spot LS is applied to the photodetector 5D along the trajectory indicated by the solidline arrows in FIGS. 11(C) through 11(E). The output signal TE from the error generator 6D can be employed as a tilt error signal.

5th Embodiment

Figure 12A:
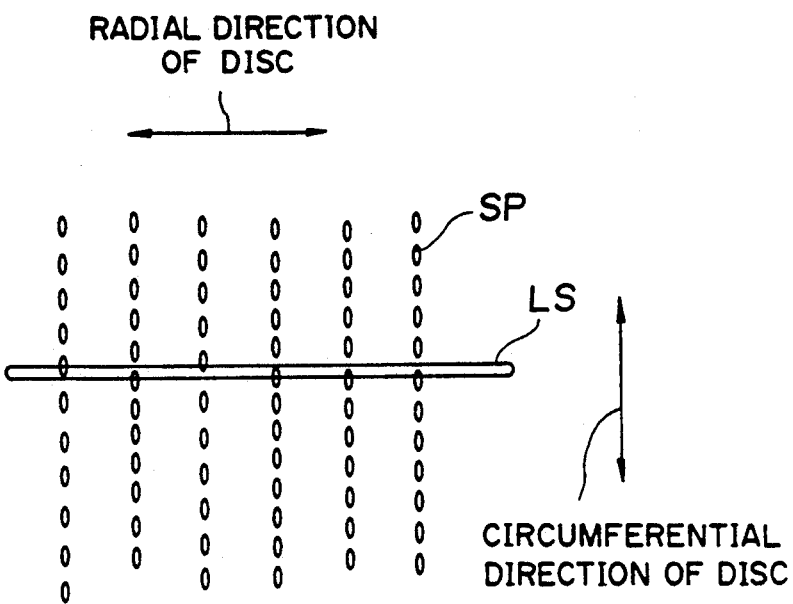
FIG. 12(A) is a diagram showing the relationship between signal pits and a linear beam spot on an optical disc for a tilt control device according to a fifth embodiment of the present invention.
Figure 12B:
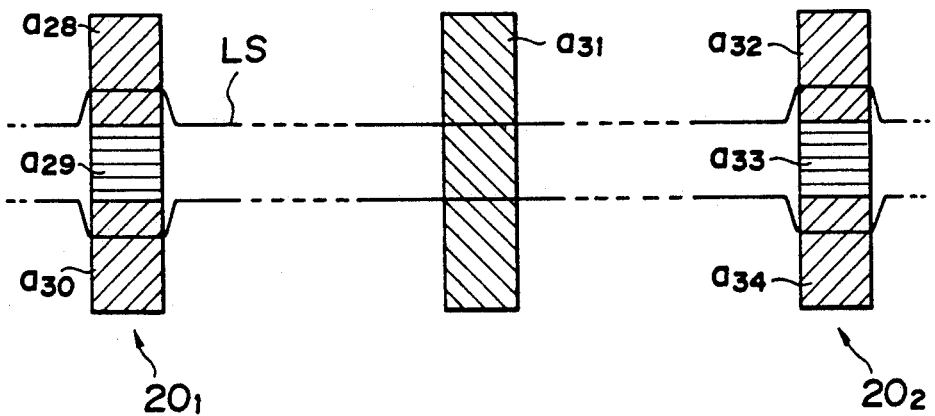
FIG. 12(B) is a plan view of a photodetector for use in the tilt control device according to the fifth embodiment of the present invention.

In each of the first through fourth embodiments described above, the linear beam spot LS is applied to the optical disc DK so that it does not fall on adjacent tracks at the same time, as shown in FIG. 3. According to a fifth embodiment, however, a longer linear beam spot LS is applied to the optical disc across a plurality of tracks of signal pits SP, as shown in FIG. 12 (A). According to the fifth embodiment, as shown in FIG. 12(B), a photodetector 5E has a photosensitive surface $a_{31}$ for reading an information signal recorded on the optical disc DK, a photodetector unit $20_1$ composed of three photosensitive surfaces $a_{28}$, $a_{29}$, $a_{30}$ spaced from the photosensitive surface $a_{31}$, and a photodetector unit $20_2$ composed of three photosensitive surfaces $a_{32}$, $a_{33}$, $a_{34}$ spaced from the photosensitive surface $a_{31}$. The three photosensitive surfaces $a_{28}$, $a_{29}$, $a_{30}$ and the three photosensitive surfaces $a_{32}$, $a_{33}$, $a_{34}$ are covered, in their entirety, with respective parallel flat glass plates (not shown) as with the first embodiment. The photodetector units $20_1$, $20_2$ jointly serve to produce a tilt error signal. If laser beam reflections from other tracks than those tracks from which a tilt error signal is to be derived are also applied to the photodetector unit $20_1$ or $20_2$, then the photodetector unit $20_1$ or $20_2$ may be arranged such that it cannot detect signals in a high-frequency range.

6th Embodiment

Figure 13:
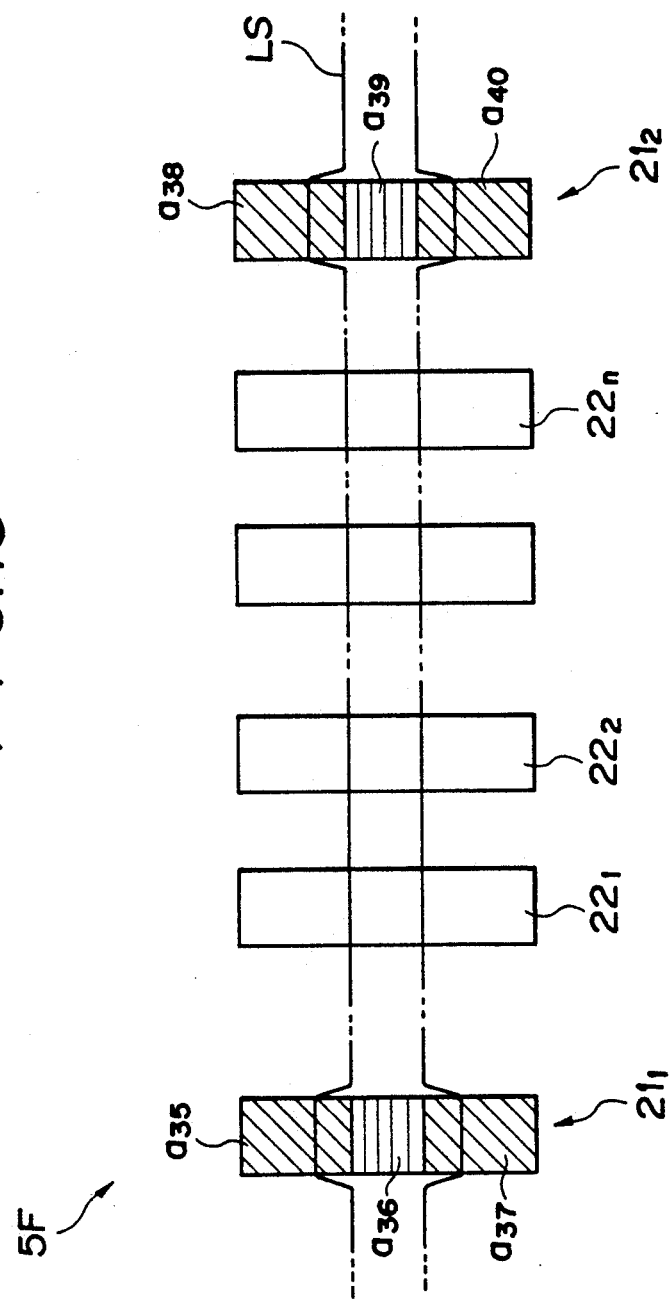
FIG. 13 is a plan view of a photodetector for use in a tilt control device according to a sixth embodiment of the present invention.

As shown in FIG. 13, a photodetector 5F according to a sixth embodiment of the present invention has a plurality of juxtaposed photosensitive surfaces $22_1$–$22_n$ for reading information signals from the optical disc DK using a very long linear beam spot LS applied to the optical disc DK. The photodetector 5F is thus capable of reading a plurality of tracks on the optical disc DK at the same time. The photodetector 5F also has a photodetector unit $21_1$ composed of three photosensitive surfaces $a_{35}$, $a_{36}$, $a_{37}$, and a photodetector unit $21_2$ composed of three photosensitive surfaces $a_{38}$, $a_{39}$, $a_{40}$ spaced from the photodetector unit $21_1$. The photodetector units $21_1$, $21_2$ are covered in their entirety with respective parallel flat glass plates (not shown) as with the first embodiment.

In the above embodiments, certain photosensitive surfaces of the photodetector are covered with a parallel flat glass plate. However, they may be covered with a lens, a Fresnel lens, a cylindrical lens, or an optical element with a varying distribution of refractive indexes. Such a lens or an optical element may be spaced from the photosensitive surfaces.

In the illustrated embodiments, the photosensitive surfaces for producing a tilt error signal and an information signal are disposed in the same plane. However, the photosensitive surface for producing an information signal may be positioned somewhere else, and a reflected light beam may be guided thereto by a half-silvered mirror or some other optical element.

While each of the illustrated photodetectors is shown as including two photodetector units, it may be composed of three or more photodetector units.

Although certain preferred embodiments of the present invention have been shown and described in detail, it should be understood that various changes and modifications may be made therein without departing from the scope of the appended claims.

What is claimed is:

1. An optical pickup for reading information recorded on a recording surface of an optical information storage medium, comprising:
   a light beam source for emitting a linear light beam;
   an optical system for converging said linear light beam as a linear image on the recording surface and collecting and emitting a linear light beam reflected from said recording surface;
   refracting means for refracting the reflected linear light beam emitted from said optical system; and
   a plurality of photodetector units each having a plurality of photosensitive surfaces for photoelectrically converting the reflected linear light beam applied thereto from said refracting means into a plurality of respective detected signals indicative of a tilt of said optical system with respect to the optical information storage medium.

2. An optical pickup according to claim 1, wherein each of said photodetector units comprises a photodetector element having said photosensitive surfaces thereon, said photosensitive surfaces extending parallel to each other across said photodetector element in a radial direction of said information storage medium.

3. An optical pickup according to claim 1, wherein each of said photodetector units comprises a photodetector element having said photosensitive surfaces thereon, said photosensitive surfaces being arranged successively across said photodetector element in a circumferential direction of said information storage medium.

4. A tilt control device for use in an optical pickup for reading information recorded on a recording surface of an optical information storage medium, comprising:

a light beam source for emitting a linear light beam;

an optical system including an objective lens for converging said linear light beam as a linear image on the recording surface and collecting and emitting a linear light beam reflected from said recording surface;

refracting means for refracting the reflected linear light beam emitted from said optical system;

a plurality of photodetector units each having a plurality of photosensitive surfaces for photoelectrically converting the reflected linear light beam applied thereto from said refracting means into a plurality of respective detected signals;

processing means for processing said detected signals from said photodetector units into a tilt error signal indicative of whether said linear light beam is applied perpendicularly to said recording surface; and control means responsive to said tilt error signal for directly controlling said objective lens positionally with respect to the optical information storage medium to apply said linear light beam perpendicularly to said recording surface.

5. A tilt control device according to claim 4, wherein said photodetector units comprises a first and a second photodetector units for producing a first and a second detected signals, and said tilt error signal comprises a difference between said first detected signal and said second detected signal.

6. A tilt control device according to claim 5, wherein each of said photodetector means comprises a photodetector element having said photosensitive surfaces thereon, said each of said photodetector elements comprises first, second and third photosensitive surfaces for producing first, second and third electric signals, and each of said detected signals comprises a difference between said first signal and the sum of said second and third electric signals.

7. A tilt control device according to claim 6, wherein each of said photosensitive surfaces extending parallel to each other across said photodetector elements in a radial direction of the optical information storage medium, and each of said first photosensitive surfaces is disposed between said second photosensitive surface and said third photosensitive surface.

8. A tilt control device according to claim 5, wherein each of said photodetector element comprises first and second photosensitive surfaces for producing a first and a second electric signals, and each of said detected signals comprises a difference between said first electric signal and said second electric signal.

9. A tilt control device according to claim 6, wherein said photosensitive surfaces extending parallel to each other across said photodetector element in a circumferential direction of said optical information storage medium.

10. A tilt control device according to claim 4, wherein said refracting means comprises a flat glass plate disposed on said photodetector element.

11. An optical pickup according to claim 1, wherein said refracting means refracts the reflected linear light beam to vary a width of the reflected light beam in one direction.

12. An optical pickup according to claim 11, wherein said one direction comprises a direction perpendicular to a longitudinal axis of the reflected linear light beam.

13. An optical pickup according to claim 11, wherein each of said plurality of photosensitive surfaces are arranged in line in said one direction.

14. An optical pickup according to claim 1, wherein said refracting means is arranged on said plurality of photodetectors in a manner covering the photodetectors.

15. An optical pickup according to claim 4, wherein said refracting means refracts the reflected linear light beam to vary a width of the reflected linear light beam in one direction.

16. An optical pickup according to claim 15, wherein said one direction comprises a direction perpendicular to a longitudinal axis of the reflected linear light beam.

17. An optical pickup according to claim 15, wherein each of said plurality of photosensitive surfaces are arranged in line in said one direction.

18. An optical pickup according to claim 4, wherein said refracting means is arranged on said plurality of photodetectors in a manner covering the photodetectors.

* * * * *